US012779268B2

(12) United States Patent
Li et al.

(10) Patent No.: US 12,779,268 B2
(45) Date of Patent: Nov. 3, 2026

(54) NANO-REACTOR SYSTEM FOR DECOMPOSITION OF PER- AND POLYFLUOROALKYL SUBSTANCES

(71) Applicant: Board of Trustees of Michigan State University, East Lansing, MI (US)

(72) Inventors: Hui Li, Okemos, MI (US); Stephen A. Boyd, East Lansing, MI (US); Brian J. Teppen, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 814 days.

(21) Appl. No.: 17/774,427

(22) PCT Filed: Nov. 7, 2020

(86) PCT No.: PCT/US2020/059579

§ 371 (c)(1),
(2) Date: May 4, 2022

(87) PCT Pub. No.: WO2021/092521

PCT Pub. Date: May 14, 2021

(65) Prior Publication Data

US 2022/0401777 A1 Dec. 22, 2022

Related U.S. Application Data

(60) Provisional application No. 62/933,144, filed on Nov. 8, 2019.

(51) Int. Cl.
*A62D 3/176* (2007.01)
*A62D 3/34* (2007.01)
(Continued)

(52) U.S. Cl.
CPC ............... *A62D 3/176* (2013.01); *A62D 3/34* (2013.01); *A62D 3/37* (2013.01); *C02F 1/325* (2013.01);
(Continued)

(58) Field of Classification Search
CPC . A62D 3/176; A62D 3/34; A62D 3/37; A62D 2101/22; A62D 2203/02;
(Continued)

(56) References Cited

U.S. PATENT DOCUMENTS 5,565,689 A 10/1996 Clavel et al.
7,310,061 B2 12/2007 Nagasaku et al.
(Continued)

FOREIGN PATENT DOCUMENTS

CN 108187581 A * 6/2018 ........... A62D 1/0085
CN 108435099 A * 8/2018 .......... B01F 17/0042
(Continued)

OTHER PUBLICATIONS

Minnesota Department of Health (MDH), "Perfluorooctanoic Acid (PFOA) and Water", Dec. 2023 (Year: 2023).*
(Continued)

*Primary Examiner* — Daniel Berns
*Assistant Examiner* — Joshua Maxwell Speer
(74) *Attorney, Agent, or Firm* — Harness, Dickey & Pierce, P.L.C.

(57) ABSTRACT

A reactor system for decomposing at least one of a per- or polyfluoroalkyl substance (PFAS) is provided. The system includes a material having an interior surface that defines a compartment; a subaqueous liquid in the compartment; and an electron donor in the subaqueous liquid, the electron donor configured to release a hydrated electron upon ultraviolet (UV) irradiation. The reactor system is configured so that when the electron donor releases a hydrated electron
(Continued)

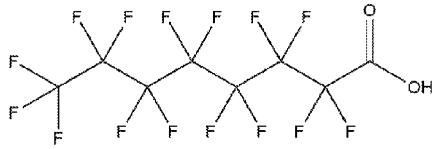

Perfluorooctanoic acid (PFOA)

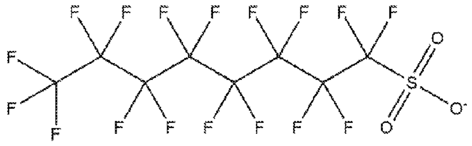

Perfluorooctane sulfonate (PFOS)

into the subaqueous liquid, the hydrated electron has a longer lifespan relative to an electron released in normal bulk phase water, and when a PFAS is present within the subaqueous liquid, the hydrated electron is capable of reductively defluorinating the PFAS and to generate fluoride ions (F). A method of operating the system to decompose PFAS is also provided.

10 Claims, 4 Drawing Sheets

(51) Int. Cl.

| | |
|---|---|
| ***A62D 3/37*** | (2007.01) |
| ***A62D 101/22*** | (2007.01) |
| ***C02F 1/32*** | (2023.01) |
| ***C02F 1/70*** | (2023.01) |
| ***C02F 101/36*** | (2006.01) |
| ***C02F 103/00*** | (2006.01) |
| ***C02F 103/06*** | (2006.01) |

(52) U.S. Cl.

CPC ........... *C02F 1/70* (2013.01); *A62D 2101/22* (2013.01); *A62D 2203/02* (2013.01); *C02F 2101/36* (2013.01); *C02F 2103/007* (2013.01); *C02F 2103/06* (2013.01); *C02F 2201/002* (2013.01); *C02F 2305/04* (2013.01)

(58) Field of Classification Search

CPC ........ C02F 1/325; C02F 1/70; C02F 2101/36; C02F 2103/007; C02F 2103/06; C02F 2201/002; C02F 2305/04; C02F 1/281; C02F 1/32; C02F 2305/023; Y02W 10/37

See application file for complete search history.

(56) References Cited

U.S. PATENT DOCUMENTS

| | | | |
|---|---|---|---|
| 7,592,386 | B2 | 9/2009 | Grootaert et al. |
| 9,896,350 | B2 | 2/2018 | Gu et al. |
| 11,072,574 | B2 | 7/2021 | Gu et al. |
| 2008/0308495 | A1 | 12/2008 | Somasundaran et al. |
| 2010/0219373 | A1 | 9/2010 | Seeker et al. |
| 2014/0246366 | A1 | 9/2014 | Kerfoot |
| 2017/0183246 | A1 | 6/2017 | Gu et al. |
| 2018/0282530 | A1 | 10/2018 | O'Shea et al. |
| 2021/0047256 | A1 | 2/2021 | Gu et al. |

FOREIGN PATENT DOCUMENTS

| | | | |
|---|---|---|---|
| CN | 109745962 | A | 5/2019 |
| WO | WO-2017/180346 | A1 | 10/2017 |
| WO | WO-2017/218335 | A1 | 12/2017 |
| WO | WO-2018/035474 | A1 | 2/2018 |

OTHER PUBLICATIONS

Gu et al. (US 2017/0183246 A1), as provided in the IDS filed May 15, 2024, in view of Zhou et al. "Enhanced sorption of perfluorooctane sulfonate and Cr(VI) on organo montmorillonite: influence of solution pH and uptake mechanism" Adsorption (2013) 19:709-715 (Year: 2013).*

ITRC, "Environmental Fate and Transport for Per- and Polyfluoroalkyl Substances" (Year: 2021).*

Shen et al. Gemini surfactant modified organo-clays for removal of organic pollutants from water: A review, Chemical Engineering Journal 375 (2019) 121910 (Year: 2019).*

Machine Translation, CN-108435099-A, Wang et al., Aug. 24, 2018 (Year: 2018).*

Sekhon "Gemini (dimeric) Surfactants", Resonance, Mar. 2004, pp. 42-49 (Year: 2004).*

Machine Translation, CN-108187581-A, DAI, Xiang-jie, Junn. 22, 2018 (Year: 2018).*

Nzeribe, B.N., et al., "Physico-Chemical Processes for the Treatment of Per- and Polyfluoroalkyl Substances (PFAS): A review", Critical Reviews in Environmental Science and Technology, 49(10): 866-915 (2019).

Simon, J.A., "The unprecedented rate of developments concerning PFAS issues," Remediation, 29(2):3-5 (2019).

Tian H., et al. "Effects of different factors on photodefluorination of perfluorinated compounds by hydrated electrons in organomontmorillonite system", Chemosphere, 191:280-287, (2018).

Supplementary Partial European Search Report dated Jul. 12, 2023 in corresponding EP Appln. No. 20885942.1.

Chang et al., "Removal of Perfluorooctanoic Acid From Water Using Calcined Hydrotalcite—A Mechanistic Study.", Journal of Hazardous Materials, vol. 368, Apr. 15, 2019, pp. 487-495., doi:10.1016/j.jhazmat.2019.01.084.

Bentel et al., "Defluorination of Per- and Polyfluoroalkyl Substances (PFASs) with Hydrated Electrons: Structural Dependence and Implications to PFAS Remediation and Management.", Environmental Science & Technology, vol. 53, No. 7, 2019, pp. 3718-3728., doi:10.1021/acs.est.8b06648.

International Search Report and Written Opinion of the International Search Authority issued in PCT/US 20/59579, mailed on Mar. 9, 2021; ISA/US.

"Full-scale pfas removal to non-detect for New England electronics manufacturing firm. Emerging Compounds Treatment Technologies. ", (Jun. 25, 2021), https://www.ect2.com/case-study/full-scale-pfas-removal-to-non-detect-for-new-england-electronics-manufacturing-firm/.

Tian H, Gao J, Li H, Boyd SA, Gu S (2016)., "Complete Defluorination of Perfluorinated Compounds by Hydrated Electrons Generated from 3-Indole-acetic-acid in Organomodified Montmorillonite.", Scientific Reports, 6:32949., DOI: 10.1038/srep32949, 2016.

Haoting Tian, Yong Guo, Bo Pan, Cheng Gu, Hui Li, and Stephen A. Boyd, 2015, "Enhanced Photoreduction of Nitroaromatic Compounds by Hydrated Electrons Derived from Indole on Natural Montmorillonite.", Environmental Science and Technology, 49:7784-7792.

Jansen, Kerri, "'Forever Chemicals' No More? These Technologies Aim to Destroy PFAS in Water.", Cen.acs.org, Mar. 25, 2019, https://cen.acs.org/environment/persistent-pollutants/Forever-chemicals-technologies-aim-destroy/97/i12.

Chang E, Adami H, Boffetta P, Wedner H, Mandel J., 2016., "A critical review of perfluorooctanoate and perfluorooctanesulfonate exposure and immunological health conditions in humans.", Crit Rev Toxicol., 46:279-331.

EPA's PFAS Action Plan, (Feb. 2019), <https://www.epa.gov/sites/production/files/2019-02/documents/pfas_action_plan_021319_508compliant_1.pdf>.

Frawley RP, Smith M, Cesta MF, Hayes-Bouknight S, Blystone C, Kissling GC, Harris S, Germolec D, (2018)., "Immunotoxic and hepatotoxic effects of perfluoro-n-decanoic acid (PFDA) on female Harlan Sprague-Dawley rats and B6C3F1/N mice when administered by oral gavage for 28 days.", J. Immunotox., 15(1):41-52., DOI: 10.1080/1547691X.2018.1445145.

PFAS Action Act of 2019., US Congress, (2019), <https://www.congress.gov/bill/116th-congress/house-bill/535/all-info>.

Ross I, McDonough J, Miles J, Parvathy PS, Kochunarayanan T, Kalve E, Hurst J, Dasgupta SS, Burdick J, (2018)., "A review of emerging technologies for remediation of PFAS.", Remediation, 28:101-126.

Toxicological Profile for Perfluoroalkyls, (Jun. 2018)., Center for Disease Control., <https://www.atsdr.cdc.gov/toxprofiles/tp200.pdf>.

Chen Zhanghao et al. (2020). Efficient Reductive Destruction of Perfluoroalkyl Substances under Self-Assembled Micelle Confinement. Environmental Science & Technology, 54(8), 5178-5185.

Extended European Search Report from European Application No. 20885942.1 dated Sep. 27, 2023.

(56) References Cited

OTHER PUBLICATIONS

Examination Report from European Application No. 20885942.1 dated Nov. 10, 2024.

* cited by examiner

Perfluorooctanoic acid (PFOA)

Perfluorooctane sulfonate (PFOS)

NANO-REACTOR SYSTEM FOR DECOMPOSITION OF PER- AND POLYFLUOROALKYL SUBSTANCES

FIELD

The present disclosure relates to reactors and methods for rapidly decomposing per- and polyfluoroalkyl substances.

BACKGROUND

This section provides background information related to the present disclosure which is not necessarily prior art.

Per- and polyfluoroalkyl substances (PFAS) are a group of synthetic chemicals that have been in use since the 1940s. PFAS are chemically and thermally stable, hydrophobic, lipophobic compounds used in many consumer products, including stain repellents, water and oil surfactants, non-stick coatings, and aqueous firefighting foams. PFAS are environmentally persistent, and have been detected in a variety of media and biota, including public water supplies, human serum and breast milk, and wildlife. PFAS manufacturing and processing facilities, facilities using PFAS in production of other products, airports, and military installations are the main contributors of PFAS releases into the air, soil, and water. Due to their widespread use and persistence in the environment, most people in the United States have been exposed to PFAS. There is evidence that continued exposure above specific levels to certain PFAS may lead to adverse health effects. Two common PFASs, perfluorooctanoic acid (PFOA) and perfluorooctane sulfonic acid (PFOS), were removed from production, and regulatory initiatives were developed to eliminate emissions and product content. However, these two chemical have very long life time and persist as "forever chemicals" in the environment. In addition, other chemicals in this same class continue to be developed and go unregulated, meaning they will continue to accumulate in the environment.

PFAS are a class of chemicals containing an aliphatic chain to which at least one carbon (C) atom is fully connected with fluorine (F) atoms. These chemicals have extremely high thermal and chemical stability originating from the C—F covalent bond, which is the strongest single bond in organic chemistry. This C—F bond manifests the inherent structural stability recalcitrant to most types of natural chemical and biologically-mediated transformations. Therefore a large input of energy is required to destroy these C—F bonds, which cannot be degraded by microbial or human metabolism. Because of its harmful effects, the environmental protection agency (EPA) of the U.S. has established a health advisory level of 70 ng/L for the combination PFOA and PFOS in drinking water.

Currently, the removal efficiency of PFAS in traditional wastewater and drinking water treatment facilities is very low to nonexistent. A ternary treatment can be implemented in which activated carbons or ion exchange resins adsorb some PFAS from water. However, this treatment does not effective decompose the PFAS, and the disposal of resulting PFAS-loaded sorbents can be problematic. Therefore, a new treatment that destroy PFAS in wastewater and drinking water treatment trains, as well as at contaminated sites, is desired.

SUMMARY

This section provides a general summary of the disclosure, and is not a comprehensive disclosure of its full scope or all of its features.

In various aspects, the current technology provides a reactor system for decomposing at least one of a per- or polyfluoroalkyl substance (PFAS), the reactor system including a material having an interior surface that defines a compartment; a subaqueous liquid in the compartment; and an electron donor in the subaqueous liquid, the electron donor being configured to release a hydrated electron upon UV irradiation, wherein the reactor system is configured so that when the electron donor releases a hydrated electron into the subaqueous liquid, the hydrated electron has a longer lifespan relative to an electron released in normal bulk phase water, and when a PFAS is present within the subaqueous liquid, the hydrated electron is capable of reductively defluorinating the PFAS and to generate fluoride ions ($F^-$).

In one aspect, the material is a layered double hydroxide.

In one aspect, the layered double hydroxide is a hydrotalcite having a positively charged interior surface.

In one aspect, the hydrotalcite has the formula: $[M^{2+}_{1-x}M^{3+}_{x}(OH)_2]^{x+}A^{n-}_{x/n}\cdot mH_2O$, wherein $M^{2+}$ is a divalent metal, $M^{3+}$ is a trivalent metal, A is an anion selected from the group consisting of $CO_3^{2-}$, $NO_3^-$, $F^-$, $Cl^-$, and combinations thereof, $1\leq n\leq 1000$, and $0<x<24$.

In one aspect, the hydrotalcite includes a Brucite layer having the formula $[M^{2+}_{1-x}M^{3+}_{x}(OH)_2]^{x+}$.

In one aspect, the $M^{2+}$ is $Mg^{2+}$, $M^{3+}$ is $Al^{3+}$, A is $CO_3^{2-}$, and n is 2.

In one aspect, the hydrotalcite comprises a Brucite layer having the formula $[Mg_6Al_2(OH)_{16}]^{2+}$.

In one aspect, the electron donor comprises a carboxylate that associates with the positively charged interior surface.

In one aspect, the PFAS includes a carboxylate or sulfonate that associates with the positively charged interior surface.

In one aspect, the material is a hydrotalcite having a positively charged interior surface, and the electron donor comprises a carboxylate that electrostatically associates with the interior surface, and wherein the system is substantially free of hexadecyltrimethylammonium (HDTMA).

In one aspect, the material is a micelle and the interior surface includes hydrophobic tails.

In one aspect, the micelle is formed from amphiphilic lipids having 1 hydrocarbon tail, 2 hydrocarbon tails, 3 hydrocarbon tails, or combinations thereof, and a polar head group.

In one aspect, the polar head group is cationic.

In one aspect, the lipids are gemini lipids.

In one aspect, the electron donor has a hydrophobic region that associates with the interior surface and a conjugated structures that is capable of stabilizing hydrated electrons.

In one aspect, the reactor system is adapted to a waste water treatment plant, a drinking water treatment plant, a pump and treat system, or a landfill site.

In one aspect, the electron donor is electrostatically associated with the interior surface of the material.

In various aspects, the current technology also provides a water treatment system having a treatment vessel including the reactor system.

In one aspect, the water treatment system is a drinking water treatment system, a waste water treatment system, or a pump and treat system.

In various aspects, the current technology further provides a method of making a reactor system, the method including forming a material having an interior surface defining a compartment comprising a subaqueous liquid; and incorporating an electron donor into the subaqueous liquid, wherein the electron donor releases a hydrated electron into the subaqueous liquid when contacted by ultraviolet (UV) light, the hydrated electron having a longer lifespan relative to an electron released in normal bulk phase water, and wherein the hydrated electron is capable of reductively reducing a per- or polyfluoroalkyl substance (PFAS).

In one aspect, the material is a layered double hydroxide (LDH) made by adding aluminum nitrate ($Al(NO_3)_3$) and magnesium nitrate ($Mg(NO_3)_2$) to water having a pH of from about 9 to about 11 to form a mixture; precipitating a solid material from the mixture; washing the solid material; hydrothermally treating the solid material; and lyophilizing the hydrothermally treated solid material to form the LDH having the compartment, wherein the LDH is resuspended in water prior the incorporating, resulting in the accumulation of the subaqueous liquid in the compartment.

In one aspect, the incorporating the electron donor in the subaqueous liquid includes adding the electron donor to the water having the resuspended LDH.

In one aspect, the water having the resuspended LDH is water including a per- or polyfluoroalkyl substance (PFAS).

In one aspect, the material includes micelles made by adding cationic gemini surfactants into water at a concentration of from about 2 to about 5 times greater than the critical micelle concentration (CMC) of the cationic gemini surfactants in the water to form the micelles defining the compartment including the subaqueous liquid.

In one aspect, the incorporating the electron donor in the subaqueous liquid includes adding the electron donor to the water having the micelles.

In one aspect, the water having the micelles is water including a per- or polyfluoroalkyl substance (PFAS).

In various aspects, the current technology yet further provides a method of decomposing a per- or polyfluoroalkyl substance (PFAS), the method including contacting a reactor system to water including the PFAS, the reactor system including a material having an interior surface that defines a compartment, a subaqueous liquid in the compartment, and an electron donor in the subaqueous liquid; and directing ultraviolet (UV) radiation to the reactor system, wherein the UV radiation contacts the electron donor and causes the electron donor to release a hydrated electron to the compartment, and wherein the hydrated electron contacts a PFAS molecule in the compartment and reductively defluorinates the PFAS molecule so that a fluoride ion ($F^-$) is released into the compartment.

In one aspect, the contacting the reactor system to the water including the PFAS includes dispersing the reactor system to the water as a preformed reactor system.

In one aspect, the contacting the reactor system to the water including the PFAS includes dispersing the material to the water, and dispersing the electron donor to the water, wherein the electron donor is incorporated into the material in the water to form the reactor system.

In one aspect, the material includes a layered double hydroxide (LDH).

In one aspect, the material includes micelles including at least one cationic gemini surfactant.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
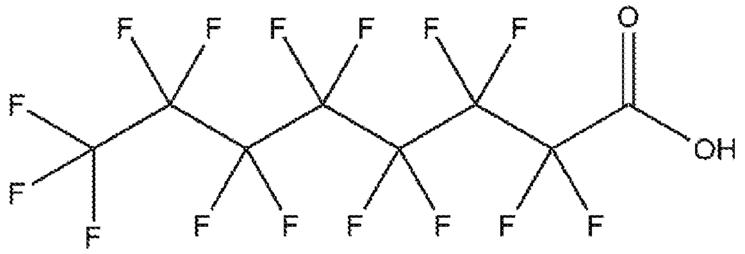
FIG. 1 shows molecular structures of perfluorooctanoic acid (PFOA) and perfluorooctane sulfonate (PFOS).
Figure 1:
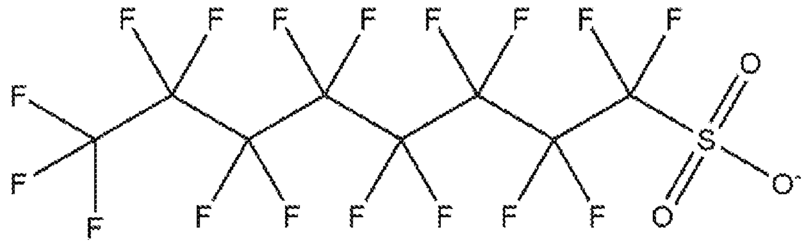

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The current technology provides an advanced reductive process (ARP), which includes a combination of activation methods, such as ultrasound, ultraviolet light, microwaves, and electron beams, with reducing agents (i.e., reductants), such as ferrous iron, sulfide, sulfite, iodide, and dithionite, to generate very reactive reducing radicals that mineralize contaminants to less toxic products. The oxidizing hydroxyl radical (OH), the reducing hydrogen radical ($H^-$), and the hydrated electron ($e^-_{aq}$) are the most reactive free radicals produced during ARPs. This current technology utilizes methods for forming and stabilizing hydrated electrons, which are energetic enough to break down PFAS into innocuous byproducts.

Accordingly, the current technology utilizes hydrated electrons to reduce PFAS molecules, including perfluorooctanoic acid (PFOA) and perfluorooctane sulfonate (PFOS), the structures of which are shown in FIG. 1. Although hydrated electrons have a typical lifespan of a few milliseconds in water, the current technology provides for hydrated electron formation in subaqueous environments, which extends the lifetime of the hydrated electrons to great than or equal to about 0.5 seconds (s), greater than or equal to about 0.5 s to less than or equal to about 3 hours or even longer, including lifetimes of about 0.5 s, 1 s., 2 s, 3 s, 4 s, 5 s, 6 s, 7 s, 8 s, 9 s, 10 s, 20 s, 30 s, 40 s, 50 s, 1 min, 2 min, 3 min, 4 min, 5 min, 6 min, 7 min, 8 min, 9 min, 10 min, 15 min, 20 min, 25 min, 30 min, 35 min, 40 min, 45 min, 50 min, 55 min, 1 hr, 1.5 hr, 2 hr, 2.5 hr, 3 hr, and longer. As used herein, the term "subaqueous environment" is synonymous with the term "less aqueous environment" and refers to water-limited environments that are more hydrophobic relative to "normal" water. The hydrated electrons quickly decompose PFAS molecules by reducing them as they release fluoride ions at non-toxic levels.

The subaqueous environment is provided in defluorination reactors, or defluorination nano-reactors. In some aspects, hydrotalcites are provided at different magnesium/aluminum (Mg/Al) molar ratios as nano-sized defluorination reactors that do not include hexadecyltrimethylammonium (HDTMA). Hydrotalcites are layered double hydroxides with positively charged surfaces originating from an aluminum (Al) substitution for magnesium (Mg). By varying an Al/Mg ratio in the hydrotalcites by substituting Mg with Al, a varying positive charge density is generated on surfaces of hydrotalcites for adsorption of anionic PFASs (many PFASs are anions) and carboxylate-containing electron donors, such as indole acetic acid (IAA), ascorbic acid (AA), kojic acid, (deprotonated to form anions), various organic or biomolecules having conjugated structures, and combinations thereof, as non-limiting examples. Electron donors having conjugated structures can further stabilize released hydrated electrons. In addition, these minerals swell in water, which favors the intercalation of hydrated electron clusters, and anionic PFASs as well. The interlayer environments of hydrotalcites serve as nano-reactors favoring defluorination reactions of intercalated PFASs. In addition, hydrotalcites contain only Al- and Mg-oxides, which do not raise any environmental concerns in treatment trains.

Alternative to hydrotalcites, gemini surfactants can be used to form a subaqueous (hydrophobic) phase (micelle aggregates) in aqueous solution to facilitate PFAS sorption and to enhance the stability of hydrated electrons in the subaqueous phase, both of which will promote the defluorination reactions. Gemini surfactants comprise two surfactant molecules, including conventional surfactants, covalently bound together by a short spacer group, i.e., a linker, between the head groups or the tails. The terminal hydrocarbon tails, saturated or unsaturated $C_2$-$C_{50}$, can be either rigid or flexible, with two polar head groups. Cationic head groups, for example, provide good interaction with electron donors/stabilizers (such as IAA, AA, kojic acid, and/or biomolecules) and anionic PFASs. Non-limiting examples of cationic surfactants include primary, secondary, and tertiary amines (pH<10), e.g., octenidine dihydrochloride (which is a gemini surfactant), quaternary ammonium, such as dodecyltrimethylammonium bromide (DTAB), tetradecyltrimethylammonium bromide (TTAB), cetrimonium bromide (CTAB), cyltrimethylammoniump-toluene sulfonate (CTAT), octadecyltrimethylammonium bromide (OTAB), tetradecyltriphenyl phosphonium bromide (TTPB), cetyltrimethylammonium chloride (CTAC), cetylpyridinium chloride (CPC), benzalkonium chloride (BAC), tetrabutylammonium chloride (TBAC), benzethonium chloride (BZT), dimethyldioctadecylammonium chloride, dioctadecyldimethylammonium bromide (DODAB), hydroxyethyl laurdimonium chloride, and dimethyldioctadecylammonium chyloride (DODAC), carbonates, such as hydroxymethyl dioxolanon and propylene carbonate, 5-bromo-5-nitro-1,3-dioxane, lecithin, and combinations thereof. The linker can be a $C_1$-$C_{20}$ saturated or unsaturated aliphatic group, optionally substituted, as a non-limiting example. Gemini surfactants have remarkably low critical micelle concentration (CMC) that is from about 15 to about 100 times less than that if the corresponding conventional surfactants of equivalent chain length. In addition, the formed micelles demonstrate different spatial self-assembled configurations that offer the option to facilitate defluorination reactions to varying extents.

Figure 2:
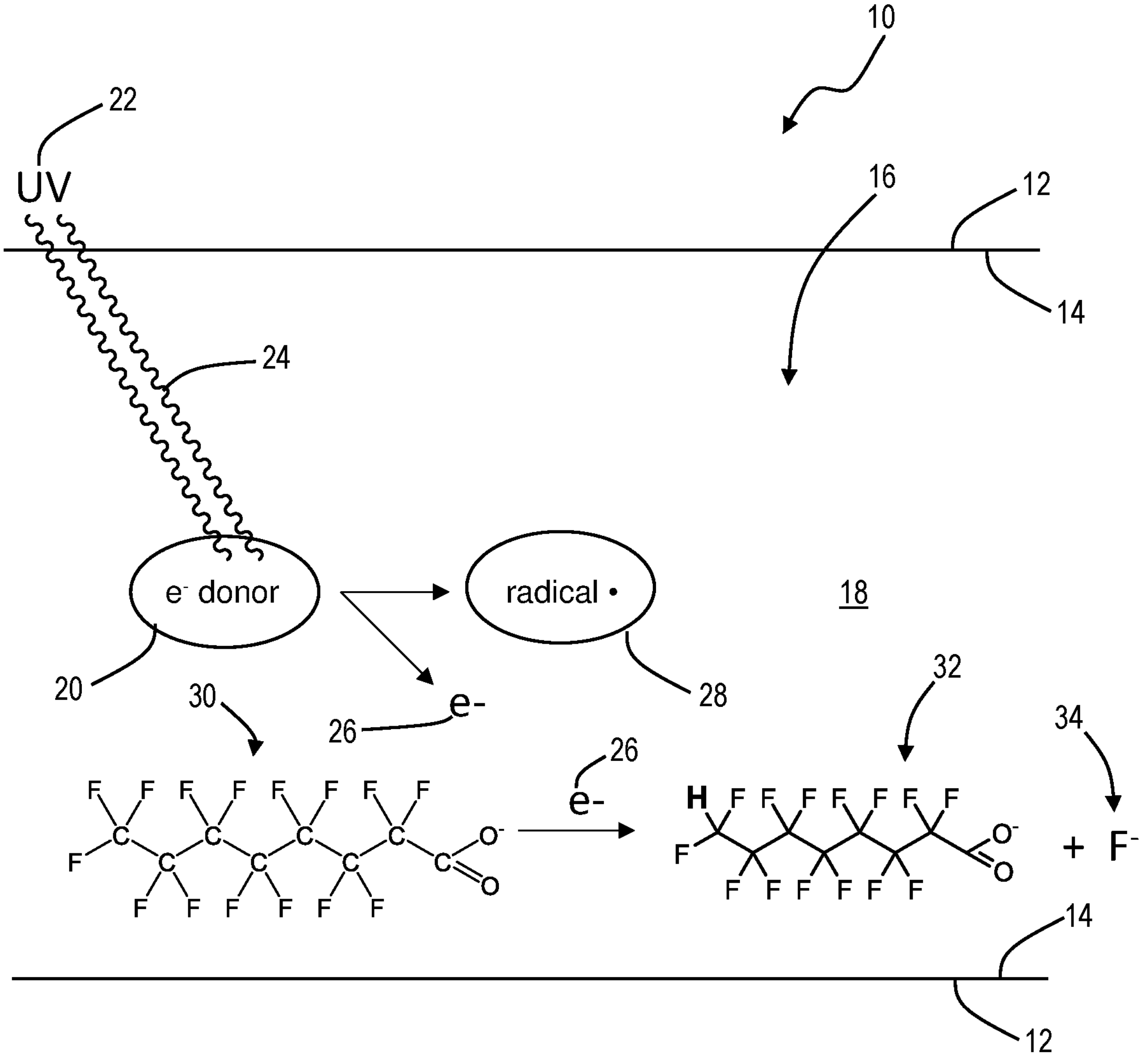
FIG. 2 is a schematic illustration of a nano-reactor system according to various aspects of the current technology.

With reference to FIG. 2, the current technology provides a system 10, which can be referred to as a nano-reactor, for decomposition of a per- or polyfluoroalkyl substance (PFAS). The system 10 comprises a material 12, such as a support or housing, having an interior surface 14 that defines a compartment 16, i.e., an interior compartment. The interior compartment 16 is a subaqueous compartment 18 contained within the compartment 16, that is, the amount of water molecules is much less compared to a bulk water phase. Although the subaqueous liquid comprises water, the limited volume and PFASs provided a hydrophobic phase. Therefore, the subaqueous liquid 18 is more hydrophobic and less hydrophilic than "normal" bulk phase water. An electron donor 20 is also present within the subaqueous compartment 18. The electron donor 20 can be associated with an aspect of the interior surface 14. The system 10 also includes a source of ultraviolet radiation (UV) 22, which can be, for example, a UV lamp or the sun. The electron donor 20 is configured to directly associate with the interior surface 14. In some aspects, the electron donor is configured to directly associate with the interior surface 14, such that there are no intermediate, i.e., linking, molecules between the electron donor 20 and the interior surface 14. The electron donor 20 is additionally configured to, upon the operation of the UV radiation source and receiving UV irradiation 24, to release an electron into the subaqueous liquid as a hydrated electron upon UV irradiation. The electron donor 20 can also serve to help stabilize the hydrated electron. As such, the electron donor 20 can also be referred to as an electron stabilizer. As a result of losing an electron, the electron donor 20 becomes a radical 28.

The system 10 is configured so that when the electron donor 20 releases the hydrated electron 26, the hydrated electron 26 has a lifespan of longer than about 1 s in the subaqueous compartment 18, and when a PFAS 30 is present within the subaqueous compartment 18 (and associated with the internal surface in accordance with some aspects), the hydrated electron 26 is capable of reducing the PFAS 30 and to generate a reduced PFAS 32 and a fluoride ion ($F^-$) 34. Put another way, the hydrated electron 26 reductively defluorinates the PFAS, wherein a fluorine of the PFAS is released as a fluoride ion replaced in the PFAS by hydrogen. The PFAS 30 is continuously reduced by the hydrated electrons 26 until all of the fluorides are removed and released as the fluoride ions 34. The fully reduced PFAS can be in the form of aliphatic carboxylic acids, such as acetic acid and formic acid. Moreover, the resulting fluoride ions 34 are present at levels that are non-toxic to humans and non-human mammals and other animals that are not mammals, including as birds, fish, amphibians, and reptiles.

Figure 3:
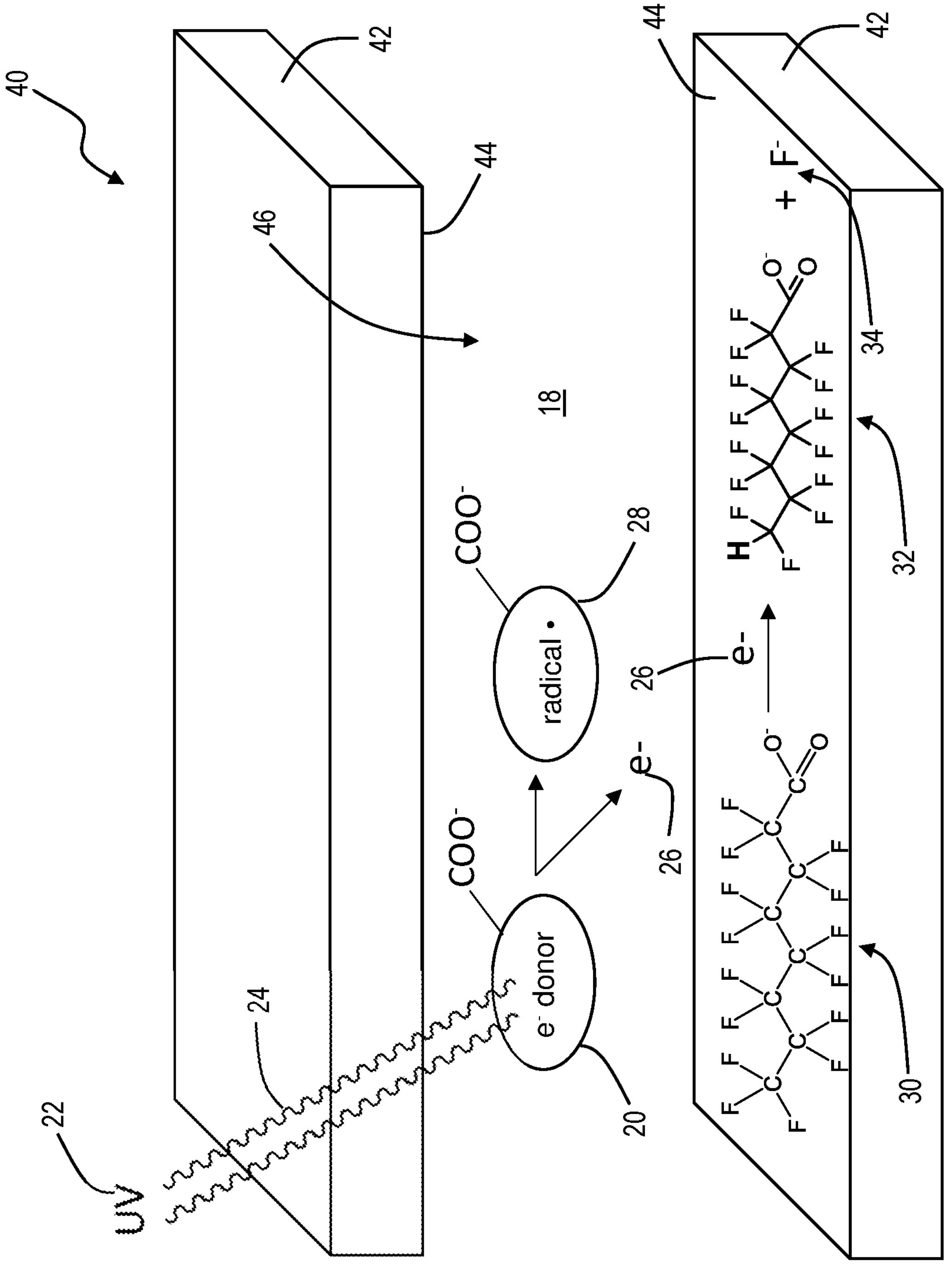
FIG. 3 is a schematic illustration of a nano-reactor system including a layered double hydroxide according to various aspects of the current technology.

FIG. 3 shows a system 40. Where components of the system 40 are the same as those of the system 10 of FIG. 2, the same reference numeral is used. The system 40 reduces PFASs in the same manner as the system of FIG. 2, but includes a specific material to define a nano-reactor. The system 40 comprises the source of UV radiation 22 and a layered double hydroxide (LDH) 42. An LDH is a soil mineral being an ionic solid having a generic layer sequence [AcB Z AcB]n, where c represents layers of metal cations (and may include magnesium cations and/or aluminum cations), A and B are layers of hydroxide ($HO^-$) anions, and Z are layers of other anions and neutral molecules (such as water), and n reflects that the mineral structure includes a number of repeating units, where $1 \leq n \leq 100{,}000$ or $100 \leq n \leq 100{,}000$. Put another way, the LDH includes stacked brucite-like [$Mg(OH)_2$] sheets in which the trivalent cation, $Al^{3+}$, substitutes a portion of $Mg^{2+}$ present in the sheets, although it is understood that other environmentally friendly divalent and/or trivalent metals may be employed. This isomorphous substitution of $Al^{3+}$ for $Mg^{2+}$ creates net positive charges distributed on interior surfaces. As such the LDH 42 comprises interior surfaces 44 having positive charges and that define an interior gap or space, referred to herein as a compartment 46.

In some variations, the LDH 42 comprises hydrotalcite, which has a positively charged surface. Hydrotalcite has the formula $[M^{2+}_{1-x}M^{3+}_{x}(OH)_2]^{x+}A^{n-}_{x/n}\cdot mH_2O$, wherein $M^{2+}$ is a divalent metal, $M^{3+}$ is a trivalent metal, A is an anion selected from the group consisting of $CO_3^{2-}$, $NO_3^-$, $F^-$, $Cl^-$, and combinations thereof, n is 1 or 2, and 0<x<24. Hydrotalcite includes a surface region referred to as a "Brucite layer" having the formula $[M^{2+}_{1-x}M^{3+}_{x}(OH)_2]^{x+}$. As such, hydrotalcite has a positively charged interior surface. As a non-limiting examples, $M^{2+}$ is $Mg^{2+}$, $M^{3+}$ is $Al^{3+}$, A is $CO_3^{2-}$, n is 2, and $0.15 \leq x \leq 0.33$, which yields $Mg_6Al_2(OH)_{16}CO_3\cdot 4H_2O$ having a Brucite layer of $[Mg_6Al_2(OH)_{16}]^{2+}$. However, the Mg can be substituted with Al to change surface charge properties and charge. For example a $Mg^{2+}/Al^{3+}$/molar ratio can vary from about 2 to about 8 or from about 2 to about 6.

The system 40 comprises the electron donor 20 that releases the hydrated electron 26 upon being irradiated by the UV radiation 24, forms the radical 28, and stabilizes the hydrated electron 26. The electron donor 20 has a negatively charged side group, such as a carboxylate, that associates electrostatically, e.g., ionically, with the positively charged interior surface 44. Put another way, the electron donor 20 associates with the interior surface 44 through electrostatic interactions. The PFAS 30 can also include a carboxylate or a sulfonate that becomes associated the interior surface 44. Non-limiting example of a suitable electron donors 20 include indole acetic acid (IAA), ascorbic acid (AA), kojic acid, and various organic molecules or biomolecules containing conjugated structures.

A method of making the system 40 comprises performing a co-precipitation at a substantially constant pH of from about pH 9 to about pH 11, e.g., pH 10. As such, the method comprises filling a reaction vessel is with water, and adjusting the pH to from about 9 to about 11 (e.g., pH 10) with sodium hydroxide (NaOH). The method then comprises adding aluminum nitrate ($Al(NO_3)_3$) and magnesium nitrate ($Mg(NO_3)_2$) dropwise, with vigorous stirring, to the pH-adjusted water at a desired Mg/Al molar ratio (e.g., from about 2:1 to about 8:1), preferably while bubbling an inert gas through the water (e.g., $N_2$) and while maintaining the pH at 9-11, to form a mixture. The method then comprises washing the mixture with water at least one time, for example, 1 to 5 times, to remove excessive nitrate. After removing the water, a solid material comprising remains. Next, the method comprises hydrothermally treating the solid material by heating the solid material in an oven or autoclave to a temperature of form about 100° C. to about 150° C., e.g., about 121° C., for from about 30 minutes to about 60 minutes, although it is understood that shorter or longer time periods may also achieve suitable results. The method also includes freeze drying the hydrothermally treated solid material to generate an LDH powder as the LDH 42. This LDH minerals is naturally occurring soil minerals and more environmental friendly used in environmental remediation The method further includes incorporating the electron donor 20 into the LDH 42. In some variations, the incorporating is performed by transferring the LDH 42 into water to form a suspension, and adding the electron donor 20 to the suspension, and stirring for from about 10 minutes to about 1 hour. During the stirring, the electron donor 20 is taken in by the LDH 42 to form the nano-reactor system 40, which can be dispersed into PFAS-containing water for treatment. In other variations, the method includes adding the LDH 42 directly to PFAS-containing water to be treated. The method then includes adding the electron donor directly to the PFAS-containing water including the LDH 42. Both the electron donor and the PFAS become associated with the LDH 42 to form the nano-reactor system 40. It is understood that he electron donor 20 and the LDH 42 can be added to the PFAS-containing water in any order, including simultaneously. The amount of electron donor 20 added depends on the PFAS concentration in the water being treated. In some aspects, the electron donor 20 is added at an electron donor:fluorine (in PFAS) molar ratio of greater than 1.

Figure 4:
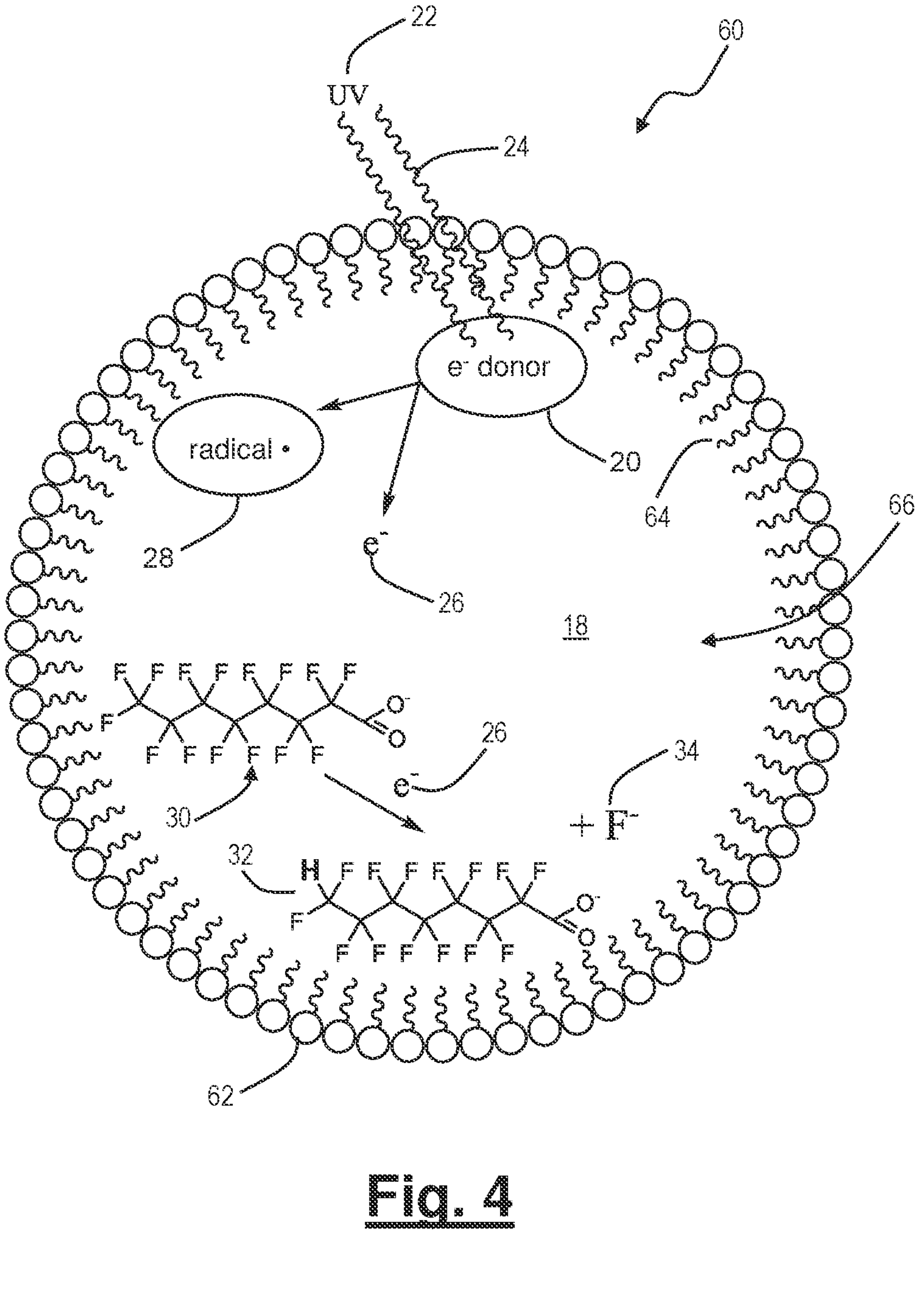
FIG. 4 is a schematic illustration of a nano-reactor system including a micelle according to various aspects of the current technology.

FIG. 4 shows a system 60. Where components of the system 40 are the same as those of the system 10 of FIG. 2, the same reference numeral is used. The system 60 reduces PFASs in the same manner as the systems 10 and 40 of FIGS. 2 and 3, but includes a specific material to define a nano-reactor. The system 60 comprises the source of UV radiation 22 and a micelle 62 comprising amphipathic lipids that are combined to define an interior surface 64 that is hydrophobic due to hydrophobic tails of the amphipathic lipids, e.g., amphipathic cationic lipids. The micelle 62 defines a compartment 66 in its interior. A hydrophobic domain is formed within the compartment 62 at or near the interior surface 64 by way of the hydrophobic tails of the amphipathic lipids. The subaqueous liquid is provided in the compartment 66.

The amphiphilic lipids comprise 1 hydrocarbon tail, 2 hydrocarbon tails, 3 hydrocarbon tails, or combinations thereof, and a polar head group. In some variations, the polar head group is cationic. In other variations. The amphipathic lipids are gemini surfactants, which are two lipids that are bound together by a spacer between the lipid tails or between the polar head groups. The micelle 62 defines a compartment 66 in its interior. The subaqueous liquid is provided in the compartment 66.

The system 60 comprises the electron donor 20 that releases the hydrated electron 26 upon being irradiated by the UV radiation 24, forms the radical 28, and that can stabilize the hydrated electron 26. In some variations, the electron donor 20 has a component, such as a hydrophobic component, that associates with the hydrophobic domain. The PFAS 30 can also include associate with the hydrophobic surface 64 and/or interior compartment 66 by way of fluorocarbon tail.

A method of making the system 60 comprises adding the amphipathic lipids, which can be gemini surfactants, to water at a concentration that is from about 2 to about 5 times greater than the critical micelle concentration (CMC) of the amphipathic lipids in the water to form the micelles 62. The method further includes incorporating the electron donor 20 into the micelle 62. In some variations, the incorporating is performed by adding the electron donor 20 to a suspension comprising the micelles 62, and stirring for from about 10 minutes to about 1 hour. During the stirring, the electron donor 20 is taken in by the micelle 62 to form the nano-reactor system 60, which can be dispersed into PFAS-containing water for treatment. In other variations, the method includes adding the amphipathic lipids directly to PFAS-containing water to be treated a concentration that is from about 2 to about 5 times greater than the CMC of the amphipathic lipids in the PFAS-containing water. The method then includes adding the electron donor directly to the PFAS-containing water including the micelles 62. Both the electron donor and the PFAS become associated with the micelles 62 to form the nano-reactor system 60. It is understood that he electron donor 20 and the micelles 62 can be added to the PFAS-containing water in any order, including simultaneously. The amount of electron donor 20 added depends on the PFAS concentration in the water being treated. In some aspects, the electron donor 20 is added at an electron donor:fluorine (in PFAS) molar ratio of greater than 1.

Any of the above systems can be adapted to a waste water treatment plant, to a drinking water treatment plant, to a pump and treat system, to a land fill site, or the like. It is understood to those skilled in the art that a pump and treat system is a system in which groundwater is pumped above ground to a treatment vessel or compartment comprising the nano-reactor, wherein treated water is discharged back to the groundwater directed for an alternative use. Moreover, the systems can be dispersed at PFAS-contaminated sites for on-site PFAS remediation.

Accordingly, the current technology also provides a method of decomposing a per- or polyfluoroalkyl substance (PFAS) using any of the above nano-reactor systems. The method comprises contacting the nano-reactor system with a PFAS-source and directing UV light to the nano-reactor system (e.g., the LDH system or the micelle system), so that the UV radiation contacts the electron donor and causes the electron donor to release a electron to the subaqueous compartment as a hydrated electron. The contacting can be performed by adding the nano-reactor system directly to the PFAS-source or by adding nano-reactor precursors, e.g., LDH minerals and electron donor or micelles and electron donor to the PFAS source, wherein the nano-reactor system are finally assembled within the PFAS source. The hydrated electron contacts a PFAS molecule in the subaqueous compartment and reduces the PFAS molecule so that a fluoride ion ($F^-$) is released into the compartment. The UV light can be directed to the nano-reactor system by using a UV lamp or by performing the method in the presence of sunlight.

The current technology also provides a method of treating a PFAS-contaminated sample. The method comprises contacting the nano-reactor system with the sample and directing UV light onto the nano-reactor system. The contacting can be performed by adding the nano-reactor system directly to the PFAS-contaminated sample or by adding nano-reactor precursors, e.g., LDH minerals and electron donor or micelles and electron donor to the PFAS-contaminated sample, wherein the nano-reactor system are finally assembled within the PFAS-contaminated sample. The UV light contacts the electron donor within the nano-reactor system causing the release of a hydrated electron into the subaqueous compartment. The hydrated electron reduces the PFAS and generates non-toxic levels of fluoride. The PFAS-contaminated sample can be water for drinking, waste water, a land fill site, a lake, a river, or water at a pump and treat system. The UV light can be directed to the nano-reactor system by using a UV lamp or by performing the method in the presence of sunlight.

The current technology also provides a method of stabilizing a hydrated electron. The method comprises directing UV light to any of the nano-reactor systems described above, wherein the UV light contacts the electron donor and causes the electron donor to release a hydrated electron into a subaqueous compartment. The hydrated electron is stabile within the subaqueous compartment for a longer period of time than an electron can remain stable within "normal" bulk phase water.

The current technology also provides a decontamination system, e.g., a water treatment system, comprising any of the nano-reactor systems described above. The decontamination system can be drinking water treatment system, a waste water treatment system, or a pump and treat system. For example, the drinking water treatment system, waste water treatment system, and pump and treat system can include a treatment vessel containing the nano-reactor system.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of decomposing a per- or polyfluoroalkyl substance (PFAS), the method comprising:

contacting a reactor system to water comprising the PFAS, the reactor system consisting essentially of:

a material having an interior surface that defines a subaqueous compartment, wherein the material is a micelle formed from amphiphilic lipids comprising 1 hydrocarbon tail, 2 hydrocarbon tails, 3 hydrocarbon tails, or a combination thereof, and a polar head group;

a subaqueous liquid in the subaqueous compartment; and an electron donor (i) associated with the interior surface, or (ii) within the subaqueous compartment, or (iii) associated with the interior surface and within the subaqueous compartment; and directing ultraviolet (UV) radiation to the reactor system, wherein the UV radiation contacts the electron donor and causes the electron donor to release a hydrated electron that reductively defluorinates the PFAS.

2. The method according to claim 1, wherein the contacting the reactor system to the water comprising the PFAS comprises dispersing the reactor system to the water as a preformed reactor system.

3. The method according to claim 1, wherein the contacting the reactor system to the water comprising the PFAS comprises dispersing the material to the water, and dispersing the electron donor to the water, wherein the electron donor is incorporated into the material in the water to form the reactor system.

4. The method according to claim 1, wherein the electron donor comprises a carboxylate.

5. The method according to claim 1, wherein the electron donor associates with the interior surface of the material.

6. The method according to claim 1, wherein the PFAS comprises a carboxylate or sulfonate.

7. The method according to claim 1, wherein the polar head group is cationic.

8. The method according to claim 1, wherein the amphiphilic lipids are gemini surfactants.

9. The method according to claim 8, wherein the gemini surfactants are cationic gemini surfactants, and wherein the contacting step comprises adding the cationic gemini surfactants into the water at a concentration of from about 2 to about 5 times greater than the critical micelle concentration (CMC) of the cationic gemini surfactants in the water.

10. The method according to claim 1, wherein the reactor system is adapted to a waste water treatment plant, a drinking water treatment plant, a pump and treat system, or a landfill site.

* * * * *